United States Patent [19]

Irwin

[11] Patent Number: 4,497,503
[45] Date of Patent: Feb. 5, 1985

[54] HYDRAULIC CONTROL SYSTEM FOR VEHICLE

[75] Inventor: Clarence C. Irwin, Dryden, Mich.

[73] Assignee: General Motors Corporation, Detroit, Mich.

[21] Appl. No.: 465,819

[22] Filed: Feb. 14, 1983

[51] Int. Cl.³ .............................................. B62K 11/14
[52] U.S. Cl. ..................................... 280/335; 74/488; 180/215
[58] Field of Search ............... 180/332, 334, 335, 210, 180/219, 215; 74/89.17, 488, 489, 507; 91/460; 92/136; 280/112 A, 421

[56] References Cited

U.S. PATENT DOCUMENTS 3,428,334 2/1969 Hils ..................................... 280/421
4,356,876 11/1982 Watanabe et al. ................... 180/210

FOREIGN PATENT DOCUMENTS 2530745 1/1977 Fed. Rep. of Germany ...... 180/219
484583 9/1953 Italy ....................................... 74/489
1149079 4/1969 United Kingdom .

Primary Examiner—Joseph F. Peters, Jr.
Assistant Examiner—Donn McGiehan
Attorney, Agent, or Firm—Charles R. White

[57] ABSTRACT

A control system for a vehicle in which a vehicle operator in a first location manually turns a twist grip in one direction to exert a force on and displace an oil column in a conduit tracing a long and tortuous path to an engine throttle remotely located from the twist grip to set the throttle valve at an infinite number of positions. When the twist grip is manually turned in an opposite direction, a spring effects return of the throttle valve and the system toward a closed throttle position.

5 Claims, 4 Drawing Figures

HYDRAULIC CONTROL SYSTEM FOR VEHICLE

This invention relates to a new and improved hydraulic control system for a vehicle component such as an engine which provides precise and infinitely variable operating setting of the controlled component and which provides optimized flexibility in routings from a manual actuator to the controlled component.

In vehicles, such as those with a cambering front operator module pivotally connected in tandem to a rear non-cambering power module, long and tortuous control routing for cables, linkages and other mechanisms between the modules are necessary. For example, routings for cables and linkages for vehicle operator control of the carburetor throttle valve of a rear engine are complex and generally result in inefficient arrangements which do not provide the vehicle operator with the precise engine control often desired for optimized efficiency. Furthermore, since the modules have relative pivoting movement when cambered, control systems proposed before this invention had to provide for this movement by precise routing or through special lost motion connections.

The present invention provides a new and improved hydraulic control system for vehicles and particularly to an engine throttle valve control which provides great flexibility in installing and routing a hydraulic control line or conduit in a long and complicated route between forward manually operated actuator and a remotely located rear engine.

In the preferred embodiment of the present invention a manual twist grip mounted on the handle bars of a cambering vehicle is employed with an associated actuator to forcibly displace a volume of oil in a flexible hydraulic line which extends from the actuator in the cambering front module to a slave cylinder associated with a throttle valve in the non-cambering rear module. When the slave cylinder is actuated by the displaced oil, the throttle valve operatively connected thereto is positioned at the precise position selected by the vehicle operator for improved control of engine output. This control system is easy to install and long service life with minimized maintenance is obtained since friction and wear is reduced.

It is a feature, object and advantage of this invention to provide a new and improved hydraulic control system for vehicles that provides precise and infinitely variable adjustment of a vehicle component being controlled and in which there is little or no lost motion in the system. With fluid transmittal of adjustment force through a hydraulic line tracing a tortional path.

Another feature, object and advantage of this invention is to provide a new and improved hydraulic control system for engine control which employs a gearing device for displacing oil in flexible tubing winding through a tortuous path from a manual control to a throttle valve and which system is easy to install and repair and which requires minimum maintenance and operates with high efficiency.

These and other features, objects and advantages will be more apparent from the following detailed description and drawing in which.

Figure 1:
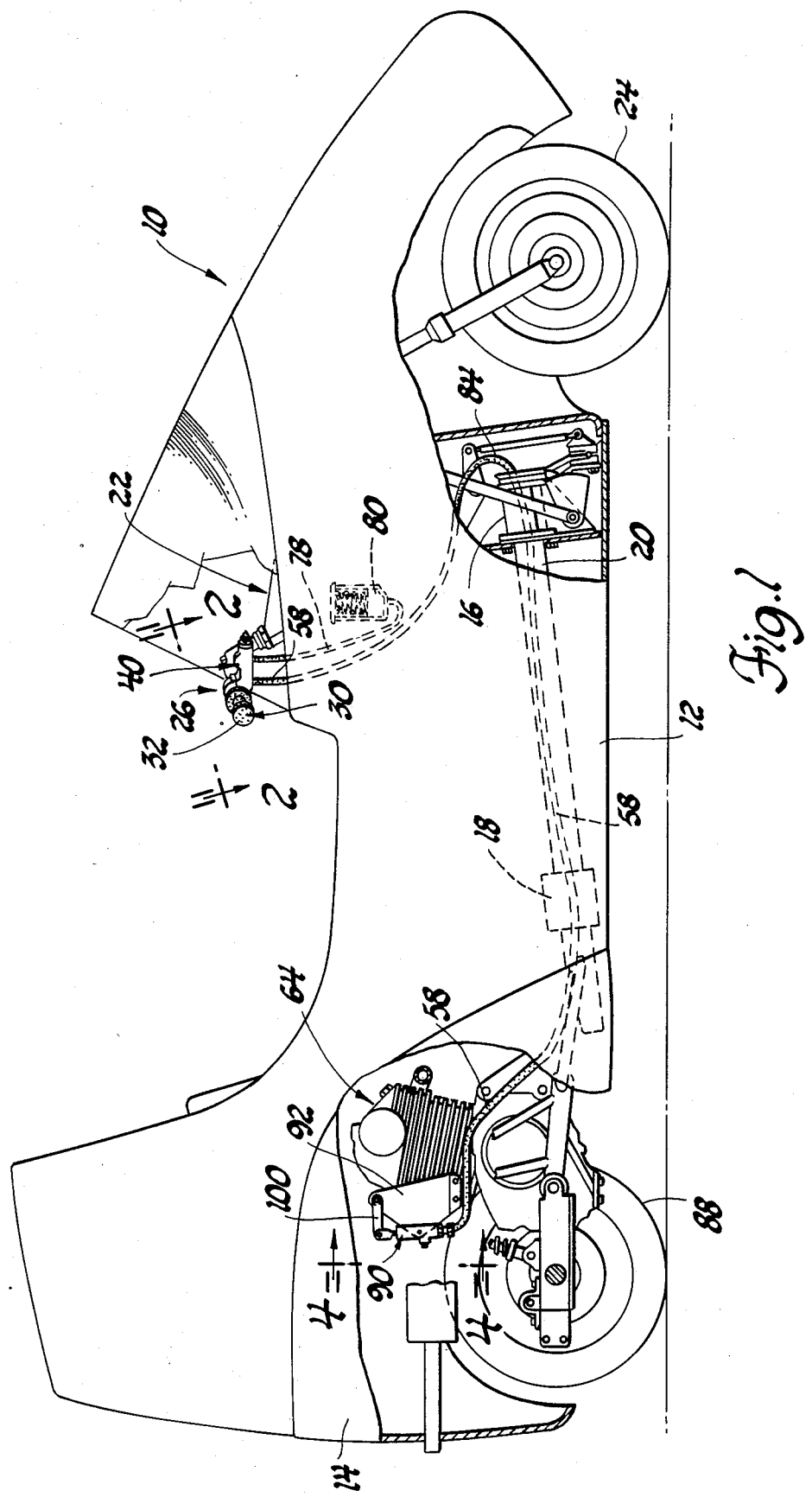
FIG. 1 is a side view with parts broken away of a vehicle having a cambering front module and a non-cambering rear module.

Turning now in greater detail to the drawing, FIG. 1 shows a narrow track vehicle 10 having a cambering front operator module 12 which is operatively connected to a non-cambering rear module 14 by front and rear bearing units 16, 18 which are operatively fitted on a centralized tubular main frame or tongue 20 that projects forwardly from secure connection with the rear module into the front module to a terminal forward point therein. Details of this vehicle and the interconnection between the modules are described in copending application Ser. No. 350,330 filed Feb. 19, 1982, now U.S. Pat. No. 4,423,795 by Winchell et al for Wheeled Vehicle With Cambering Front Module and assigned to the assignee of this invention. The disclosure of this copending application are hereby incorporated by reference into this specification.

Figure 2:
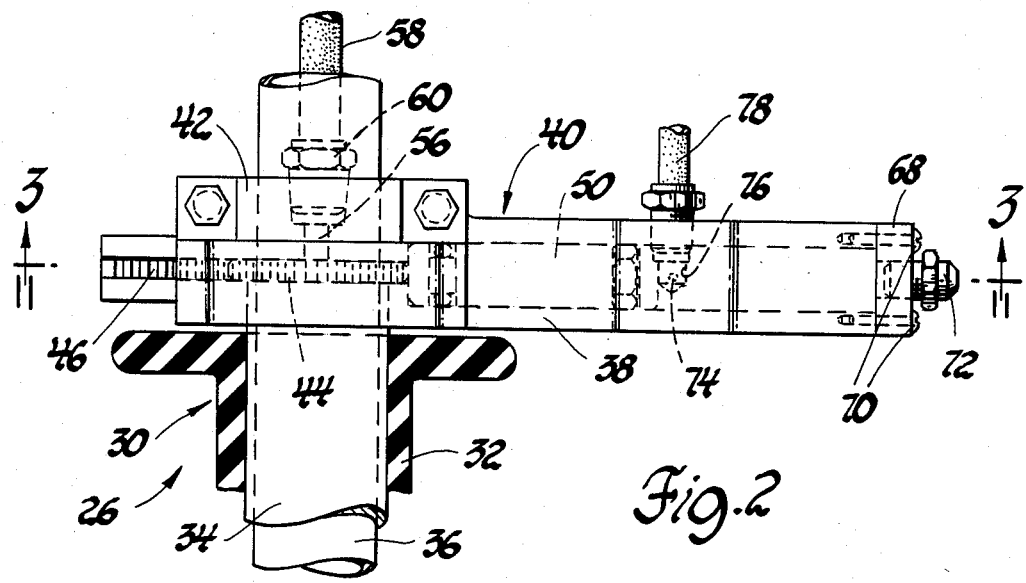
FIG. 2 is a fragmentary view of a handle bar twist grip and an actuator taken generally along lines 2—2 of FIG. 1.

Generally this vehicle has a forward steering fork assembly 22 having a front road wheel 24 mounted at the lower end thereof and a handle bar assembly 26 is mounted at the upper end. The handle bar assembly has a right hand twist grip unit 30 mounted thereon. As illustrated in FIG. 2, the twist grip unit has an outer hand grip 32 of synthetic rubber or other material which fits with tight friction engagement with a cylindrical mounting sleeve 34 of brass or other suitable material that is rotatably mounted on the handle bar assembly 36.

This sleeve 34 extends into a housing 38 of a throttle control actuator 40 mounted on the handle bar assembly by bearing cap 42. The inner end of the mounting sleeve is integrally formed with a spur-type gear 44 whose teeth mesh with the teeth of an elongated rack 46 mounted for linear movement in the housing 38. A piston 50 is attached on the inner end of the rack 46 and is slidably mounted in a bore 52 formed in the housing. The piston bore 52 communicates at its outer end with a lower hydraulic passage 54 that leads into an outlet port 56. A tubular conduit 58 preferably a flexible hose of a suitable elastomer material is connected by a fitting 60 to the port 56 which as described below, is routed to the throttle body 62 of the carburetor for control of the fuel to engine 64 carried in the rear module 14. The housing is closed by an end cap 68 secured to the body of the housing by screws 70. Element 72 threaded into the end cap is a bleeder plug for draining or adding hydraulic fluid when necessary. A small diameter feed passage 74 interconnects to a port 76 that is connected by flexible conduit 78 to a diaphragm type fluid reservoir 80 that contains hydraulic fluid used in this control.

As illustrated in FIG. 1, the main hydraulic line formed by flexible conduit 58 is routed through a long and tortuous path in the front module 12 which includes sharp turns such as the approximately 180° turn identified by numeral 84 before entry into the tubular main frame or tongue 20. From this sharp bend, the conduit 58 extends completely through the tubular main frame 20 and through a tortuous path in the rear module leading up to the rear portion of the vehicle engine 64 which operates through the transmission to drive the rear road wheels 88. As shown, conduit 58 connects into a slave cylinder 90 affixed by bracket 92 to the block of the internal combustion engine 64. The slave cylinder 90 has a piston 94 slidably mounted in a bore 96 formed therein. The piston 90 has an extension 98 that projects from the upper end of the slave cylinder 90 that is attached to the outer end of a first arm 100 of a crank assembly 102. The crank assembly includes a crank shaft 104 which is rockably mounted in the support bracket 92 attached to the block of engine 64. A second crank arm 106 extends outwardly from the crank shaft 104 and is operatively connected to a throttle valve element 108 by a cable 110. The throttle valve element 108 is operatively mounted in a carburetor throttle body 62 and is normally biased to a closed position by a helical spring 116 positioned between throttle body cap 120 and valve element 108.

Figure 3:
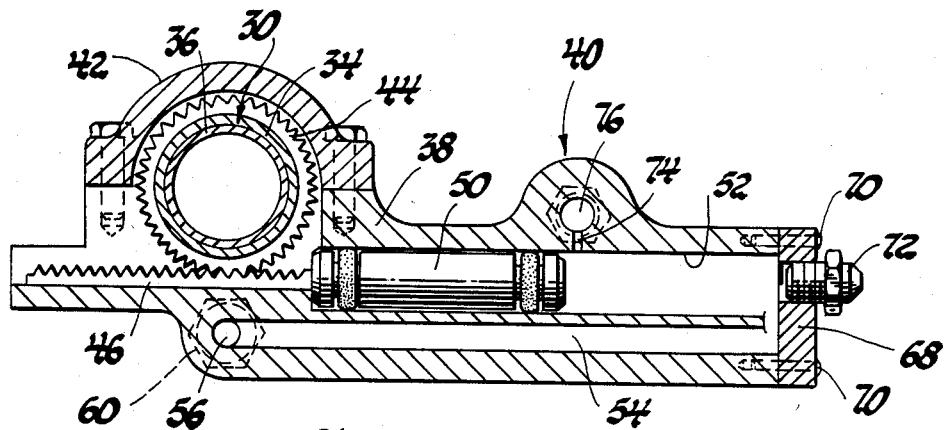
FIG. 3 is a cross-sectional view with parts in full line taken along lines 3—3 of FIG. 2.
Figure 4:
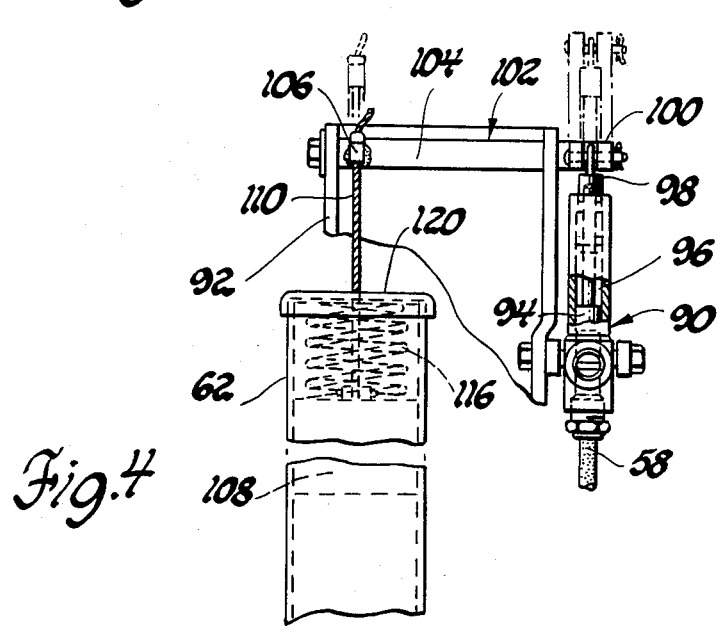
FIG. 4 is an end view taken along lines 4—4 of FIG. 1 showing the vehicle engine and slave cylinder control.

For accurate control of the throttle valve opening, the operator manually rotates handle bar grip 32 in a counterclockwise direction which turns the spur gear 44 to linearly move the rack 46. This will advance the piston 42 to the right in FIG. 3 to displace a quantity of oil within the actuator 40 and the connection conduit 58. When this occurs, the displaced oil in line 58 will forcibly move the piston 94 a selected amount to turn the crank assembly 102 so that the throttle valve element 108 is moved to an operator selected position against the action of the spring 116 to thereby control throttle valve opening. This provides the precision of direct hand adjustment of the throttle valve since lash is eliminated. When it is desired to move the throttle valve element toward a closed position to reduce engine output the twist grip unit is turned a clockwise direction a selected amount which turns spur gear 44 to move the rack 46 outwardly from actuator body 38. This rack retraction unloads the oil column so that the helical spring can move the throttle valve toward a selected position determined by the position of the piston 50 to reduce the feed of fuel mixture to the engine and thereby reduce engine output. The reservoir allows for expansion and contraction of the oil in the system and make up for any normal oil shortage that might occur.

With this invention, prior cables and complicated linkages are completely avoided so that binding and mechanical wear are reduced. Furthermore, with this new and improved control infinitely variable throttle valve positions are obtained for precise engine control. The flexibility of the conduit 58 readily accommodates the cambering or leaning of the front module with respect to the rear module.

While a preferred embodiment of the invention has been shown and described, other modifications will be apparent to those skilled in the art. Accordingly, the scope of this invention is set forth in the following claims.

The embodiments of the invention in which an exclusive property or privilege is claimed are defined as follows:

1. In a wheeled vehicle, steering means in a first location having dirigible road wheel means at the lower end thereof for contacting a vehicle support surface and a manual steering device at the upper end thereof grippable by a vehicle driver for steering the vehicle, engine means in a second location drivingly connected to rear road wheels contacting said support surface, hydraulically operable control means associated with said engine for controlling the power output thereof, manual actuator means associated with said manual steering device for operating said engine control means and the power output of said engine characterized in that the manual actuator means comprises piston means movably mounted in a piston bore formed in a housing mounted to said steering device, said bore being hydraulically coupled to said engine control means by an incompressible fluid confined in a continuous flexible conduit extending in a long and tortuous path from said housing to said control means, said fluid being displaced upon movement of said piston means to control the power output of said engine.

2. The vehicle in accordance with claim 1 and further characterized in that the manual actuator means comprises a manual twist grip mounted in said housing and on said steering device of said steering means and said manual twist grip is directly and drivingly connected to said piston means by rack and pinion means for moving said piston means for exerting a force on said control means through displacement of said fluid in said conduit in response to the predetermined turning of said manual twist grip.

3. The vehicle in accordance with claim 2 and further characterized in that said control means includes a throttle valve operatively connected to a slave cylinder and a throttle valve element biased toward a predetermined position by spring means which yieldably opposes the force applied to said throttle valve element transmitted through said fluid in response to turning of said twist grip.

4. In a wheeled vehicle having separate vehicle operator and vehicle power sections, pivot means interconnecting said sections to permit one of said sections to camber relative to the other of said sections, vehicle steering means in said operator section having dirigible road wheel means at the lower end thereof for contacting a vehicle support surface and a handlebar assembly at the upper end thereof, engine means in said power section drivingly connected to rear road wheels which support said power section and which propel said vehicle, control means in said power section associated with said engine for controlling the output thereof, manual actuator means in said operator section for operating said engine control means characterized in that the manual actuator means comprises piston means movably mounted in a piston bore of a housing mounted to said handlebar assembly, said bore being hydraulically coupled to said engine control means by incompressible fluid confined in a flexible conduit extending from said housing and from said operator section to said control means in said power section through said pivot means which interconnects said sections.

5. The vehicle in accordance with claim 4 and further characterized in that the manual actuator means is a manual hand grip mounted in said housing on a handlebar assembly of said steering means and said hand grip is drivingly connected to a pinion, said pinion being in meshing engagement with an elongated rack, said piston means being directly connected to said rack and movable thereby for exerting a force on said control means through displacement of said fluid in said conduit in response to the predetermied turning of said twist grip.

* * * * *